Feb. 25, 1969 R. A. SIDUR 3,430,102
FLASHING LIGHT DEVICE
Filed Oct. 14, 1965 Sheet 1 of 2
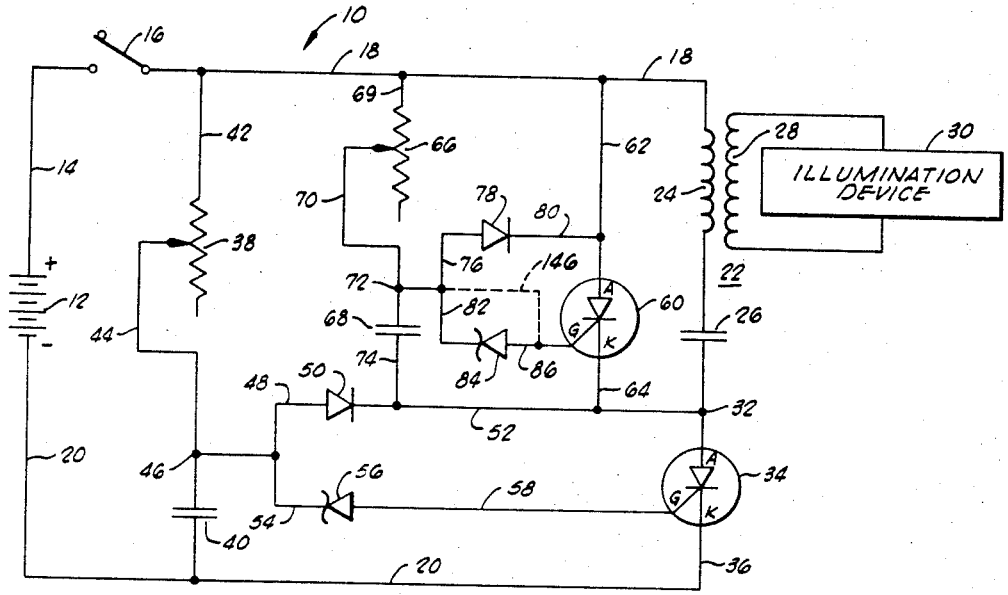
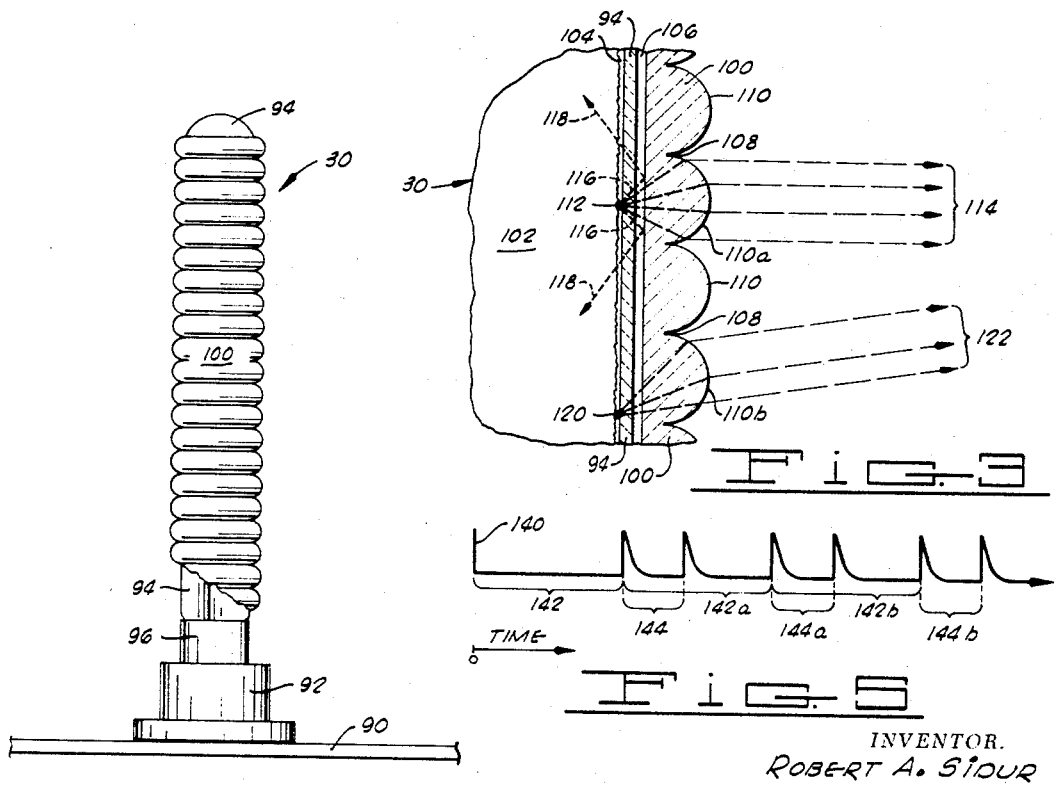
INVENTOR.
ROBERT A. SIDUR
BY
Dunlap and Laney
ATTORNEYS INVENTOR.
ROBERT A. SIDUR
BY
Dunlap and Laney
ATTORNEYS United States Patent Office 3,430,102
Patented Feb. 25, 1969

3,430,102
FLASHING LIGHT DEVICE
Robert A. Sidur, 16 Clinton Ave.,
Maplewood, N.J. 07040
Filed Oct. 14, 1965, Ser. No. 496,108
U.S. Cl. 315—239                                    13 Claims
Int. Cl. H05b 41/14

ABSTRACT OF THE DISCLOSURE

Electrical apparatus for providing periodic energization at controlled rate and highly efficient utilization of current, the apparatus consisting of circuitry for controlling application of a D-C power source through a load by means of plural resistance-capacitance timing circuits which control respective semi-conductive controlled rectifiers to enable alternate bursts of oppositely flowing current through the load in such manner as to effect great economy in expenditure of power from the power source.

---

This invention relates to improvements in the art of intermittent illumination devices, and more particularly, by not by way of limitation, it relates to an improved electronic control circuit and light director.

There are various flashing light devices included within the prior art which provide the function of intermittent illumination. In general, these prior devices are characterized by limited luminance and reliability, relatively high power consumption, and thus, considering the foregoing factors, the inability to sustain operation for a very long period without the necessity of maintenance or adjustment.

A flashing light device constructed in accordance with the present disclosure is highly efficient and flexible. The device has the capability of operating on unusually low power, such as dry cells or other reliable and inexpensive D-C sources, and the nature of the circuitry is such that it can be left unattended for long periods of time. Further, provision is made for control of the intermittent illumination timing in a unique manner such that the timing of consecutive pairs of light flashes as well as the time between the individual flashes of each pair can be set at a predetermined rate.

The attendant advantages of economy, reliability and the adjustment factors make such a device especially suitable for beacon or warning light usage on smaller lakes and the inland waterways as well as for various advertising and related applications. It should be understood, however, that the novel electronic flashing circuit may find many uses other than for illumination purposes wherein intermittent energization at controlled rates for extended periods of time are the required characteristics of operation. Further, the reliability factors which can be attributed to the present invention would justify the use of increase power components for use in larger beacons or permanent marker installations of the intermittent illumination type.

The present invention contemplates a flashing light device which operates from a self-contained power source under the control of semi-conductive controlled rectifiers to illuminate a planar directive light source. More particularly, the invention contemplates particular timing circuitry for alternately controlling the conduction of a pair of semi-conductive controlled rectifiers such that an illumination device connected as the load is energized at a predetermined rate from the primary power source and, in between these energizations and at a second predetermined rate, the load device is again energized by electrical power stored within the circuitry. The invention further provides a light director element which has the capability of concentrating a large majority of total light output into one plane or narrowly confined volume of space. The invention further contemplates novel voltage doubling circuitry as well as a voltage regulation scheme which enables greater utilization of all power drawn from the primary source.

Therefore, it is an object of the present invention to provide an economical, reliable pulsing circuit which also has the advantage of multiple adjustment as to the rate and spacing of alternate pulses of output as applied to the circuit load.

It is further an object of the present invention to provide a more efficient and flexible flashing light device wherein the energizing circuitry can provide two light output pulses for each power withdrawal from the self-contained power source thus greatly increasing the efficiency and life of unattended service.

Finally, it is an object of this invention to provide such a flashing light device which enables maximum power utilization for unit power withdrawal from a self-contained power source and, further, the device provides maximum luminance or light output within a predetermined plane of view.

Other objects and advantages of the invention will be evident from the following detailed description when read in conjunction with the accompanying drawings which illustrate the invention.

In the drawings:

FIGURE 1 illustrates the electronic circuitry for flashing light control;

FIGURE 2 illustrates a preferred embodiment of the illumination device or light source operatively coupled with the light director lens element;

FIGURE 3 illustrates an enlarged, cut-away cross-section of a portion of the illumination device and light director of FIGURE 2;

FIGURE 5 is a graph of pulse energization versus time;

Figure 7:
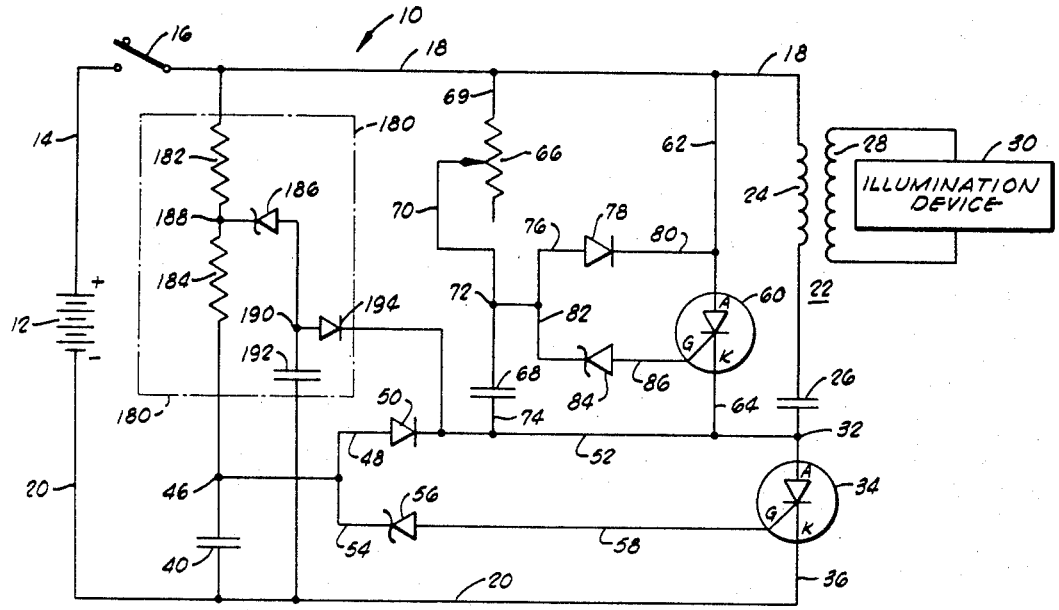
FIGURE 7 is a schematic diagram of alternative electronic control circuitry.

Referring now to FIGURE 1, the electronic control circuit 10 is supplied with primary power from a suitable D-C source 12. The D-C source 12 may be any of the conventional stored power devices; however, it is contemplated that ordinary dry cells will give excellent service both from the economy and reliability standpoints. The positive terminal of D-C source 12 is connected via lead 14 to the main power switch 16 which, in turn, delivers positive voltage on lead 18 to the electronic circuitry. A lead 20 then connects the negative terminal of the D-C source 12 to the electronic circuitry.

The load of the electronic control circuitry 10 is comprised of a transformer 22, the primary 24 of which is connected between the positive supply lead 18 and a capacitor 26. The secondary 28 of transformer 22 is then connected to a suitable illumination device 30. The transformer 22 may be any type having the necessary voltage rating; for example, the Stancor type No. PC–8406 has proven suitable when employed as a 100 to 1 step-up transformer. Also, commercially available ignition coils can be used with good results. Further, it should be understood that while the control circuitry is described with respect to an illumination device 30 herein, there are many forms of load devices which could advantageously utilize the novel pulse generation circuitry of FIGURE 1.

The capacitor 26 is connected to a junction 32 which, in turn, is connected to the anode of a semi-conductive controlled rectifier 34 such as, for example, a General Electric type C5F silicon controlled rectifier. A lead 36 then connects the cathode of semi-conductive controlled rectifier 34 to the negative supply lead 20. The semi-conductive controlled rectifier 34 has its conduction controlled through its gate electrode in conventional manner by a timing circuit made up of the rheostat connected potentiometer or resistance 38 in series with a capacitor 40. One end of the potentiometer 38 is connected through a lead 42 to the positive supply lead 18 and the wiper lead 44 is connected through junction 46 to the capacitor 40. Capacitor 40 is then connected to the negative supply lead 20. Thus, the potentiometer 38 and the capacitor 40 form an R–C combination and the junction 46 is then connected via lead 48 to the anode of a diode 50, the cathode of which is connected on lead 52 to the junction 32 and the anode of the semi-conductive controlled rectifier 34. Junction 46 is also connected through a lead 54 to the cathode of a Zener diode 56, the anode of which is connected by a lead 58 to the gate electrode of the semi-conductive controlled rectifier 34.

A second semi-conductive controlled rectifier 60, having a separate timing circuit (to be described), has its anode connected on lead 62 to the positive supply lead 18 and the cathode is connected on lead 64 to the lead 52 and junction 32. A suitable type of controlled rectifier would be the General Electric type C5U silicon controlled rectifier. Thus, the semi-conductive controlled rectifier 60 is connected in series with the semi-conductive controlled rectifier 34 and in parallel with the transformer 22 and capacitor 26 series combination.

The timing circuit for semi-conductive controlled rectifier 60 is comprised of a rheostat connected potentiometer 66 and a capacitor 68. The potentiometer 66 is connected by a lead 69 to the positive power supply lead 18 and the wiper 70 provides connection to a junction 72 and capacitor 68. The other side of capaictor 68 is connected on lead 74 to the lead 52 which is common to the anode junction 32 of semi-conductive controlled rectifier 34. The junction 72 is connected by a lead 76 to the anode of a diode 78 and its cathode is connected on lead 80 to the anode of the semi-conductive controlled rectifier 60. A parallel connection from junction 72 is provided by lead 82 to the cathode of a Zener diode 84, the anode of which is tied via lead 86 to the gate electrode of the semiconductive controlled rectifier 60.

A preferred form of the illumination device 30 is shown in FIGURES 2 and 3. The illumination device 30 could be mounted on a plate 90, which in most cases would be a panel of a housing or container in which the electronic control circuits 10 would be mounted. In this event, a suitable socket member 92 would be fastened thereon and a lead-through or other insulated connector (not shown) would be provided in the panel 90. A lamp member 94, shown as having an end base 96, is mounted within the socket 92. The lamp 94 may be any of the several suitable types of gaseous-discharge lamps which generally possess high luminous efficiency characteristics, such as neon, helium, and argon gas tubes; also, it has been found that a fluorescent light of the mercury-vapor type is suitable for achieving maximum luminosity with the least amount of power expense.

It should be understood too that certain commercially available fluorescent lights could be used in such a system merely by providing an upper end socket and a connection wire from the electronic circuirty 10 below the mounting panel 90. For example, any of the fluorescent lamps in the four to forty watt range of the type T–5 instant-start lamps (slimline type) could be employed to good advantage. The blend or type of phosphor employed within the lamp 94 would be a matter of choice depending upon the particular usage or desired color of the beacon device.

The lamp or fluorescent tube 94 is enclosed within a light director element 100, a cylindrical sleeve of suitably refractive transparent material which is formed as a series of contiguous reliefs of hemispherical cross-section. FIGURE 3, an enlarged sectional view of the side wall of the light director 100 and lamp 94, shows the construction and optical function to better advantage. The designator 102 denotes the interior space of the lamp 94, the sectional side wall or envelope of which is also shown. A coating 104 on the interior wall of the envelope of lamp 94 is suitable phosphor for converting the ultraviolet energy into visible light. The phosphor may be any of the well known types such as phosphates, tungstates, or halophosphates of calcium, magnesium, etc. These phosphors are well-known and their choice depends upon the desired color excitation which, in turn, will be dictated by the particular usage of the flashing damp device.

The light director element 100 is then shown as surrounding the lamp 94 to allow but a very small clearance space 106 therebetween. However, some design criteria may dictate that the light director 100 be discontinuous or particularly shaped as to its envelopment of the light source, lamp 94. As shown, the light director 100 is suitably molded, ground or otherwise formed to provide a series of equally spaced grooves 108 which divide a series of revolutional lands or reliefs 110, each of which has an equal hemispherical cross-section. The light director 100 may be formed from various suitable glass or plastic materials which exhibit a desirable refractive index. Also, the refractive index will have some bearing upon the thickness of the light director 100 as will be described. The use of Plexiglas having a refractive index of 1.5 has been employed to good advantage as will be further described below.

The light director 100 serves to limit the light output to an exaggerated degree so that it falls within the plane normal (or near-to-normal) to the cylindrical axis of the light director 100 and lamp 94. This effect is brought about due to the fact that each individual lens relief 110 acts as a collimating lens for all individual point sources of light activated within the phosphor layer 104 which fall within its field of view; that is, within the effective field stops. For example, a point source of light 112 is collimated by the lens relief 10a so that the majority of its fluorescent light output is refracted along a collimated beam as shown by rays 114. A part of the light from the fluorescent point source 112 would, of course, be directed along the ray paths 116, however, the angle of entry into the light director 100 would exceed the critical angle such that there would be total reflection along paths 118. At some later time (after multiple reflections) the light would be directed at a less critical angle and thereafter be outwardly directed in the illuminated plane or lobe.

In the case of light originating from point sources which are less directly situated beneath a relief element 110, the light will still be collimated but it may be directed at some slight angle to the normal from the cylindrical axis of light director 100. For example, as at the point source 120 which lays at the edge of the focal plane of a lens relief 110b, the refracted rays would be collimated at a slight angle as shown by the ray-path 122. Thus, a narrowly lobed light output results from the total illumination originating within the focal plane of each individual lens relief 110.

Actually, this is desirable since extreme light directivity could be detrimental to proper beacon function.

It should be understood that the size and design of the light director 100 will be in accordance with well-known optical principles; that is, the thickness of the wall of the light director 100 and therefore the radius of each of the individual lens reliefs 110 would be formed in accordance with the refractive index of the material employed for the light director 100. Thus, with merely ordinary design accuracy it is possible to achieve a light output which is greatly exaggerated or lobed in the plane normal to the cylindrical axis of the light director 100.

Figure 4:
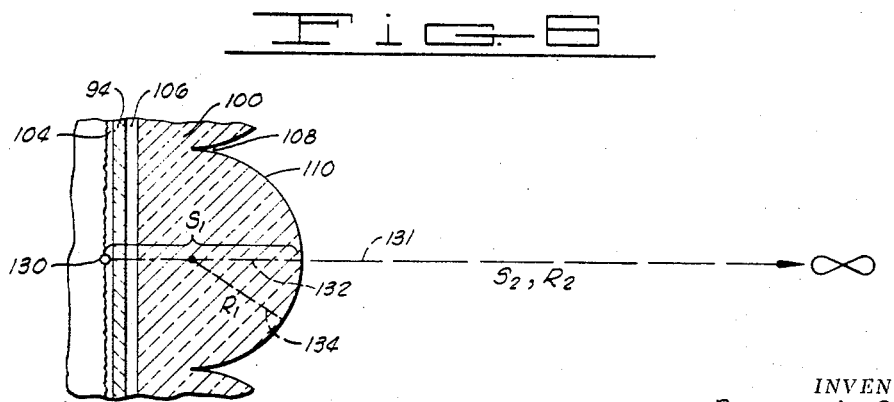
FIGURE 4 is a further enlarged cross-section showing the light director formation and the optical relationships.

For example, using Plexiglas for the light director 100, the necessary dimensions can be determined from the standard lens-makers' formula $$\frac{1}{S_1} + \frac{1}{S_2} = (n-1)\left(\frac{1}{R_1} - \frac{1}{R_2}\right) \quad (1)$$

where $S_1$ and $S_2$ represent the object distance and image distance, respectively, $n$ represents the index of refraction of the director material, and $R_1$ and $R_2$ designate the respective radii of curvature of the lens. FIG. 4 shows the dimensions as applied to a single lens relief 110.

Neglecting lens thickness, which is a negligible quantity in the design of the overall light director 100, an object point 130 is designated on the optical axis 131 of lens relief 110. The dash-line 132 then represents the object distance $S_1$ while a dash-line 134 denotes the radius of curvature $R_1$ of lens relief 110. Since the image point is at infinity, the image distance $S_2$ and radius of curvature $R_2$ are infinite and the lens-makers formula reduces to $$\frac{1}{S_1} = (n-1)\left(\frac{1}{R_1}\right) \quad (2)$$

Therefore, a refractive index of 1.5 (as for Plexiglas) further reduces the function to $R_1 = S_{1/2}$. Thus, in forming the light director 100 it is only necessary to consider the object distance $S_1$ and the radius of curvature $R_1$, maintaining a two-to-one ratio. Satisfactory performance has resulted where $R_1$ was held to one-sixteenth inch and $S_1$ was one-eighth inch; however, it is contemplated that other lens dimensions will be suggested, depending upon the particular size and usage of the illumination device.

Further, while the light director 100 is shown as having a series of circular lens reliefs 110, ease of manufacture may dictate that a threaded or helical lens relief formation be formed as by certain machining operations. It is also foreseen that still greater light beaming efficiency may be provided by grooving the inner surface of the light director material rather than the outside. In some instances, this inner grooving will be preferred and it is only necessary to machine or form the inner surface into a series of contiguous or adjacent lens reliefs which adhere to the optical requirements of providing a collimated light output beam for each point source of illumination within the light source.

OPERATION

The flashing light device will be placed at its predetermined operating position or warning location with the power switch 16 closed to begin the flashing operation. The variable resistances 38 and 66 would then be adjusted to provide the desired rate and spacing of flashes as will be more fully described later. First, however, the overall operation of the electronic control circuitry 10 will be described.

Upon closure of the main power switch 16 the voltage of the D-C source 12 is made available on the positive supply lead 18 and the negative supply lead 20. At this point the semi-conductive controlled rectifiers 34 and 60 are non-conductive and current can only flow through lead 42 and resistance 38 to charge the capacitor 40. When the capacitor 40 is charged up to a predetermined voltage as present at junction 46, the avalanche point of Zener diode 56 is exceeded so that current flows from the D-C source 12 through the resistor 34, wiper lead 44, junction 46 and Zener diode 56 and then on lead 58 through the gate-cathode path in semi-conductive controlled rectifier 34 to thereby enable anode-cathode conduction therein. When semi-conductive controlled rectifier 34 goes into conduction, the battery supply voltage on lead 18 causes current flow through the primary 24 of transformer 22 to charge up the capacitor 26. This surge of charging current through primary 24 of transformer 22 is induced over into the secondary 28 which in turn fires the illumination device 30.

Also, with conduction of the semi-conductive controlled rectifier 34, current begins to flow through resistance 66 and junction 72 to charge up the capacitor 68 and, at the same time, the capacitor 40 is discharged from junction 46 through the diode 50 and junction 32 through the anode-cathode path of semi-conductive controlled rectifier 34. Then, after the current flow through primary 24 of transformer 22 has charged the capacitor 26 to nearly the full power supply potential, the anode-cathode current through semi-conductive controlled rectifier 34 falls below its necessary holding current such that the semi-conductive controlled rectifier 34 ceases to conduct. This opens the circuit between power supply lead 18 and the negative power supply lead 20, ceasing any conduction in the capacitor 40 discharge path through diode 50 as well as the stopping of conduction in the resistance-capacitance charge path through resistance 66 and the capacitance 68. Also then, the R-C combination of resistance 38 and capacitance 40 begins to charge again and the capacitor 26 is at this time in a charged condition.

There is then no battery current flowing through the external circuit except through potentiometer 38 and capacitor 40. However, as previously stated, the potentiometer 66 and capacitor 68 charge up a small amount during conduction of the semi-conductive controlled rectifier 34, and the R-C combination continues to charge up with current supplied from the charge stored in capacitor 26. That is, current flow is from the charged capacitor 26 back through the primary 24 of the transformer 22 along power supply lead 18 and through the potentiometer 66 and junction 72 to the capacitor 68. When a predetermined voltage is attained at junction 72, the avalanche point of Zener diode 84 is exceeded and current flows from the stored charge on capacitor 26 through the primary 24, potentiometer 66, junction 72, and Zener diode 84 to the grid-cathode path through the semi-conductive controlled rectifier 60 to enable its conduction. This conduction effectively puts a short circuit across the capacitor 26 to discharge the capacitor 26 through the primary 24 of transformer 22 thereby inducing a second light output pulse from the illumination device 30. The circuit constants are such that very little of the stored current in capacitor 26 is utilized in the initial charging of capacitor 68, and thus the gating of semi-conductive controlled rectifier 60, so that nearly the total charge of capacitor 26 is emptied through the primary 24 upon conduction of the semi-conductive controlled rectifier 60.

Once the conduction is enabled in semi-conductive controlled rectifier 60 by the breakdown of Zener diode 84, the diode 78 can conduct to discharge the timing capacitor 68 through the semi-conductive controlled rectifier 60 thereby placing this timing circuit or portion of the electronic control circuit 10 in starting condition for the next sequence of pulses. Meanwhile, the R-C combination of potentiometer 38 and capacitor 40 have been charging and at some predetermined time the necessary voltage charge will be attained at junction 46 to recycle the entire operation. That is, a first pulse of current is drawn through the primary 24 of transformer 22 to rapidly charge up the capacitor 26 as allowed by conduction of the semi-conductive controlled rectifier 34, the induced electrical pulse in secondary 28 of transformer 22 providing an output light pulse from the illumination device 30. Then, with no battery power required, the capacitor 26 is discharged through a second semi-conductive controlled rectifier 60 and its timing circuit to enable a second light pulse as generated from the stored charge in capacitor 26.

The timing of the rate and spacing of light pulses is controlled by the variable resistances or potentiometers 38 and 66. Adjustment of the potentiometer 38 will position the first or basic light output pulse with respect to time and further adjustment of the potentiometer 66 will space the second light output pulse with respect to the first light output pulse. This time sequence is depicted in FIGURE 5, a graph of light pulse output with respect to time. The line 140 would denote zero time or that time when the main power switch 16 is closed to begin operation. The time interval 142 would then be the time until first firing of the illumination device 30 as triggered by the charging of capacitor 26 from the main power source, D-C source 12 (FIG. 1). Similarly, the intervals 142a and 142b to each alternate light output pulse would be determined by the same circuitry and power source. The second output pulse (of each pair), as energized from a power source comprising the charged capacitor 26, would be determined by the R-C setting of the potentiometer 66 and capacitor 68. This firing time is determined with respect to the firing of the respective previous pulses and would be denoted in FIGURE 5 by the time bracket 144 and successive time brackets 144a and 144b. The adjustment of resistances 38 and 66 enable great flexibility in the operation and setting of the beacon device. Setting the resistance 38 will place each first pulse anywhere along the time scale and the resistance 66 can then be adjusted to position each of the second respective pulses anywhere inbetween such first pulses of light output. Thus the device can be set to provide an equal interval between flashes or two flashes at relatively close intervals or, further, two flashes so close together as to appear to the human eye as one wide flash. Still further function may be enabled in certain cases by adjusting the timing circuits so that the light output is in successive flashes so close together that they would appear as a steady light to the human eye.

The actual light output of the device is formed into a donut-shaped or omnidirectional and narrowly lobed output such that maximum brilliance of the light is apparent in the desired planes. Thus, as shown in FIGURE 3, the light director 100 having a series of light lobing or concentrating lens reliefs 110 will provide a majority of light output in the normal plane, as shown by rays 114, and diminishing amounts of light output at angles diverging from the normal plane. The point source 120 and the refracted, collimated ray path 122 would denote the approximate limit of useable output light at angles above the normal path 114. Likewise, it should be understood that light ray paths at a similar angle diverging downward from the normal ray path 114 would fill out the lower limits of the lobe of output energy. In any event, the greater amount of light output will fall in the normal plane, as shown by ray path 114, or ray paths very close thereto. To summarize as to the optical advantage, the vast amount of light which would normally be lost or unuseful in the directions of propagation approaching the cylindrical axis of the light director element 100 are entirely baffled and redirected in the normal plane through the individual lens relief elements 110.

Listed below are a group of component values as selected for a typical operation of the electronic control circuit 10 (FIG. 1).

D-C source 12 _____volts__   7½ to 15
Resistance:
   38 _____kilohms__   100
   66 _____do____   100
Capacitance:
   40 _____mfd__   15
   68 _____mfd__   10
   26 _____mfd__   1500
Zener diode:
   56 _____ 7.5 volts, 1 watt
   84 _____ 6.2 volts, 1 watt The control circuit 10 provides a pulse through the load, thus energization of illumination device 30, each one and one-half seconds. Referring to FIGURE 5 then, the timing intervals 142 would each be equal to the interjected timing intervals 144 to provide a steady flashing light output.

In an alternative form of operation the junction 72 may be shorted directly to the gate electrode of controlled rectifier 60, shown as dash-line 146 bypassing Zener diode 84 (FIG. 1), and the cuircuit provides a double flash every three seconds. The three second interval is dependent upon the inclusion of the component values listed above and the interval between double flashes is about 0.2 second such that the appearance is that of a single flash of greater total brightness. Still further alternative operation is enabled by changing values of resistances 36 and 66, and capacitances 26, 40 and 68 such that continuous, steady pulsing is enabled at very high rates; the pulse output through the load or transformer 22 then assuming a D-C to A-C conversion function.

ALTERNATIVE EMBODIMENT: FIGURE 6

Figure 6:
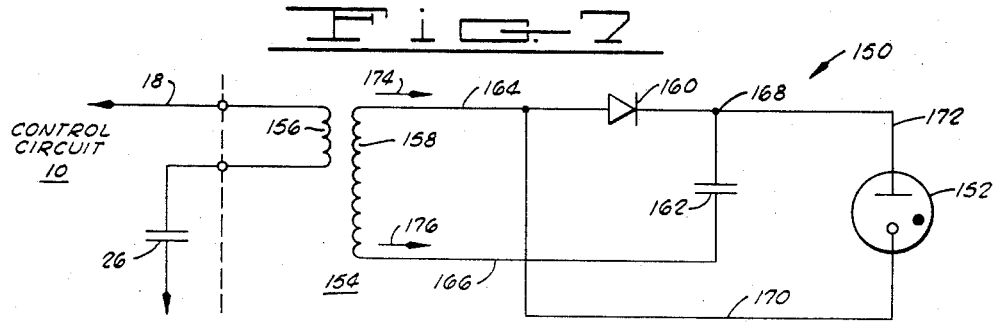
FIGURE 6 is a schematic diagram of an alternative form of voltage doubling load device which can be employed with the control circuitry of FIGURE 1.

The electronic control circuit 10 may also be utilized with an alternative form of voltage doubling load device 150 as shown in FIGURE 6. The circuit 150 is a novel voltage doubling circuit which utilizes the double pulses (for each primary power withdrawal) from control circuit 10 to provide a high intensity illumination output from lamp 152. It should be stated again that end results other than illumination may find use for the similar control circuit 10 (FIG. 1) and voltage doubling circuit 150 (FIG 6).

The voltage doubling circuit 150 consists of a transformer 154 having a primary 156 connected between D-C supply lead 18 and capacitor 26 in the same manner as transformer 22 of FIGURE 1. The transformer may be any step-up power transformer having the proper turns ratio such as, for example, a commercially available type known as the Stancor type No. PC-8406. The secondary winding 158 is then connected between the anode of a diode 160 and one side of a capacitor 162 by respective leads 164 and 166, the other side of capacitor 162 and the cathode of diode 160 being connected to a junction 168. The lamp 152 is then connected between the lead 164 and junction 168 by a cathode lead 170 and an anode lead 172.

A suitable lamp for use with the circuit 150 is a commercially available lamp known as the Amglo type No. 60C4R which is a red neon signal lamp having a starting or breakdown voltage between 1700 and 2500 volts and a run voltage of about 1250 volts (RMS) at 12 milliamperes. Other equivalent lamps having different colors but similar voltage characteristics may easily be substituted in the doubler circuit 150.

In the operation of the alternative embodiment (FIGS. 1 and 6), the electronic control circuit 10 is set in some predetermined manner whereby it delivers energizing pulses to the voltage doubling load device 150. The first pulse of a timing sequence is delivered from the D-C source 12 (FIG. 1) through the lead 18 and primary 156 of transformer 154 to charge up the capacitor 26. This charging pulse then induces the pulse in the secondary winding 158 which moves in a first direction as indicated by the arrow 174. Neglecting rectifier and capacitor losses, the current in the direction of arrow 174 can pass through the low forward resistance of diode 160 to charge the capacitor 162 up to that value of voltage induced across the transformer 154. The lamp 152 does not conduct, hence there is not yet any illumination, and the capacitor 162 will remain in its charged state until the next application of a pulse to the load device 150. That is, when the second pulse from electronic control circuit 10 is induced, when capacitor 26 is discharged as previously described, a second pulse is induced in the transformer secondary 158 which travels in the direction of arrow 176. Current flow in this direction charges the capacitor 162 such that a still higher or doubled voltage is developed across the capacitor 162. Thus, a doubled voltage will be available between the anode lead 172 and the cathode lead 170. If the breakdown voltage of lamp 152 was at the doubled voltage value it would then fire or illuminate. Actually this would be a critical setting and generally it will be advantageous to choose the circuit components such that the breakdown voltage of lamp 152 is at some high value slightly less than the total doubled voltage values.

In one successfully operated unit wherein the transformer 154 had a 100 to one step-up ratio, a pulse voltage between 10 and 14 volts applied to the primary 156 provided a voltage of between 1000 and 1400 volts across the capacitor 162. Then, after the doubling or reversed current facet of the operation, there was found to be between 2000 and 2800 volts available across the lamp 152, that is, as between junction 168 and the cathode lead 170. These values were found sufficient to operate the Amglo type 60C4R lamp which is rated to have a starting voltage from 1700 volts to 2500 volts.

This particular type of voltage doubling circuit requires but a single rectifier and a single capacitor and is therefore cheaper and more reliable from the standpoint of long unattended operation. This reduction in components, particularly a high voltage capacitor, enables a smaller and lighter operational unit.

ALTERNATIVE EMBODIMENT: FIGURE 7

The circuitry of FIGURE 7 shows essentially that circuitry of electronic control circuit 10 of FIGURE 1 which has additional components included for the purpose of affording additional stability in the circuit operation. The additional components are those shown within the dash-line 180 and these are connected in the electronic control circuit 10 in place of the resistance or potentiometer 38 of FIGURE 1. The circuitry within dash-line 180 provides a function of keeping the pulse rate constant over a wide range of voltage variation from the D-C supply source 12 with a minimum of wasted energy in the regulation process. There are several well-known ways of doing this; for example, by using a properly rated Zener diode or by a relaxation oscillator connection employing a unijunction transistor. However, these types of voltage regulation devices require a wasting or draining off of a valuable battery power in their operation.

The desirability of such a voltage regulation device as included in FIGURE 7 is apparent when you consider some of the possible effects of a diminution in the available D-C supply power. As the battery voltage decreases, the charging time of capacitor 40 (FIGS. 1 and 7) increases so that the pulse rate or illuminating flash rate slows down. For example, a battery which shows a decrease in output voltage from 18 volts down to 12 volts, due to aging, environmental problems or whatever, could produce a variation as great as 300 percent in the pulse rate. Hence, a newly set up unit operating from an 18 volt supply and pre-set to deliver 60 pulses per minute could dwindle to as little as 20 pulses per minute if for any reason the supply voltage would drop down to 10 or 12 volts. Thus, the circuitry within dash-line 180 may be included within the electronic control circuit 10 to provide stability in the output pulse rate despite variations in supply voltage and this is afforded by performing supply voltage regulation with little or no waste of source power.

Within the dash-line 180, a pair of resistors 182 and 184 are connected in series between the D-C supply lead 18 and the junction 46 to timing capacitor 40. A Zener diode 186 is connected at its cathode to a junction 188, between resistors 182 and 184, while its anode is connected to a junction 190. The junction 190 is connected to a capacitor 192 which, in turn, is connected to the D-C supply return lead 20 and the junction 190 is also connected anode-to-cathode through a diode 194 to the lead 54, a common connection between the anode of semi-conductive controlled rectifier 34 and the cathode of the semi-conductive controlled rectifier 60.

In the operation of the device of FIGURE 7, the desired timing characteristics are pre-set into the circuit by selecting the resistances of the timing circuits. That is, a first timing circuit consisting of the resistance sum of resistors 182 and 184 in circuit with the capacitor 40 and also, in the manner of the previous operation of FIGURE 1, the resistance of potentiometer 66 would be chosen to deliver the necessary R-C value with the capacitor 68. When the switch 16 is closed to begin operation, current flows through resistors 182 and 184 to charge the capacitor 40. Initially, all of the current flow is through the resistors 182 and 184 to charge capacitor 40; however, when the voltage at junction 188 exceeds the breakdown voltage of the Zener diode 186 a portion of the charging current flows through the Zener diode 186 and through junction 190 to charge the capacitor 192. When the capacitor 40 reaches its required charge value such that Zener diode 56 gates on the semi-conductive controlled rectifier 34, the excess charge resulting from the voltage regulation is discharged from capacitor 192 through the diode 194 and the anode-cathode path through controlled rectifier 34 to the battery return 20.

The effect of the voltage regulation components then is to allow charging at a first or normal rate until the breakdown voltage or Zener diode 186 is present at junction 188, and thereafter slowing down the charging rate of capacitor 40 at those higher voltages which exceed the breakdown voltage of Zener diode 186. Thus, the charging rate of capacitor 40 is maintained reasonably constant and battery power is not lost through the regulation process since it is applied through the semi-conductive controlled rectifier 34 along with the discharge of capacitor 40 to increase the charge intensity to capacitor 26 and therefore, effectively, the current through primary 24 of transformer 22. Therefore, the higher the supply voltage from D-C source 12, the more Zener diode 186 will conduct to maintain the charging current through resistors 182 and 184 to the capacitor 40 at a uniform rate.

The device has proven to give very good results using the following component values:

Resistors:
    182 _____kilohms__ 40
    184 _____do____ 50
Zener diode:
    186 _____volts breakdown__ 7.1
Capacitor:
    192 _____microfarads__ 125

It was found that when using the above components the battery voltage or potential of D-C source 12 could be varied between 10 and 18 volts with very little variation in the output pulse rate. The output pulse rate in this case was set at 60 pulses per minute and was maintained very constant over the full range of battery supply voltages. It is apparent that the voltage regulation circuitry within dash-line 180 only serves to regulate the timing of the first pulse from the D-C source 12 along supply lead 18 to charge up the capacitor 26 upon firing of the semi-conductive controlled rectifier 34 as previously described (operation of FIG. 1). The second or alternate pulse in the series is then timed by resistance or potentiometer 66 and capacitor 68 relative to the first timing circuit (resistors 182 and 184 and capacitor 40) and it follows uniformly at its pre-set interval.

The foregoing disclosure sets forth a flashing light device which is especially suitable for warning and directive indications in areas where cost may be a limiting factor. The device is especially suitable for placement on small lakes and lesser traveled inland waterways as well as private uses which may take many forms. The device is characterized by low power requirements and therefore long, unattended service life as well as high reliability and flexibility of operation.

The particular electronic control circuitry should not be limited to only those applications for low power and greater economy. The control circuitry exhibits accuracy and reliability which may well entitle it to consideration in much larger or more high powered applications. The form of the invention adhered to in the description herein is merely meant to provide a uniform teaching of function and operation and the component values and ratings referred to should not be construed as a limiting factor.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. An intermittent illumination apparatus comprising:
   illumination means;
   load means connected to energize said illumination means;
   a capacitor connected in series with said load means;
   a direct current energy source connected across said load means and capacitor;
   means including a first semi-conductive controlled rectifier and resistance-capacitance timing circuitry for periodically applying a pulse of current from said direct current source to charge said capacitor and thereby energize said load means at a first time rate; and
   means including a second semi-conductive controlled rectifier and resistance-capacitance timing circuitry for periodically discharging said capacitor to re-energize said load means at a second time rate which is constant relative to said first time rate.

2. An intermittent illumination apparatus as set forth in claim 1 which is further characterized to include:
   a lens element for directing the light output from said illumination means so that illumination is omnidirectional in a narrow-lobe distribution.

3. An intermittent illumination apparatus as set forth in claim 2 wherein:
   said illumination means is a gas discharge light source; and
   said lens element is a cylindrical light director enclosing said gas discharge light source and having along the length thereof a series of contiguously arranged annular lens reliefs of equal hemispherical cross-section.

4. An intermittent illumination apparatus as set forth in claim 1 wherein said means including a first semi-conductive controlled rectifier comprises:
   a semi-conductive controlled rectifier having its anode connected to said capacitor and its cathode connected to said direct current source;
   a resistance and second capacitance connected in series across said direct current source;
   a diode having its anode connected to the junction of said resistance and second capacitance and having its cathode connected to the anode of said semi-conductive controlled rectifier; and
   a Zener diode having its cathode connected to the junction of said resistance and second capacitance and having its anode connecting to the gate electrode of said semi-conductive controlled rectifier whereby said Zener diode conducts after a predetermined charge time of said resistance and second capacitance to gate the semi-conductive controlled rectifier into conduction thereby charging said capacitor to energize said illumination load means.

5. An intermittent illumination apparatus as set forth in claim 4 wherein said second means including a semi-conductive controlled rectifier comprises:
   a second semi-conductive controlled rectifier connected in parallel with said load means and said capacitor and having its anode connected to said direct current source and having its cathode connected to the anode of said first semi-conductive controlled rectifier;
   a series connected second resistance and third capacitor connected in parallel with said load means and capacitor;
   diode means having its anode connected to the junction of said second resistance and third capacitance and having its cathode connected to said anode of said second semi-conductive controlled rectifier; and
   Zener diode means having its cathode connected to the junction of said second resistance and third capacitance and having its anode connected to the gate electrode of said second semi-conductive controlled rectifier whereby conduction of said Zener diode at a pre-determined charge time of said second resistance and third capacitance gates said second semi-conductive controlled rectifier into conduction such that said capacitance discharges through said load means to energize said illumination means.

6. An intermittent illumination apparatus as set forth in claim 1 wherein the load means and illumination means comprise:
   a transformer having its primary winding connected in series with said capacitor and said direct current energy source;
   a second capacitor connected in series with said transformer secondary winding;
   a diode connected in series with said transformer secondary winding and said capacitor to allow capacitor charging in only one direction of current flow; and
   a discharge illumination device connected in parallel with said diode which device has a breakdown voltage within that range of voltage as developed across said second capacitor from both the charging and discharging of said capacitor in series with said transformer primary winding.

7. A circuit for intermittent energization of a load comprising:
   a D-C source;
   a capacitor having one side connected through said load to the positive side of said D-C source;
   a first semi-conductive controlled rectifier having the anode connected to said capacitor and the cathode connected to the negative side of said D-C source;
   a second semi-conductive controlled rectifier having the anode connected to the positive side of said D-C source and the cathode connected to said anode of said first semi-conductive controlled rectifier;
   resistance-capacitance timing means for periodically enabling conduction of said first semi-conductive controlled rectifier to charge said capacitor positively thereby energizing the load at a first time rate; and
   second resistance-capacitance timing means for periodically enabling conduction in said second semi-conductive controlled rectifier to discharge said capacitor through said load to thereby re-energize said load at a second time rate which is constant relative to said first time rate.

8. A circuit as set forth in claim 7 which is further characterized in that:
   said first resistance-capacitance means is connected across said D-C source for enabling conduction of said first semi-conductive controlled rectifier at a first pre-determined rate; and
   said second resistance-capacitance means is connected in parallel with said capacitor and load for enabling conduction of said second semi-conductive controlled rectifier at a second pre-determined rate as taken with respect to the enabling of conduction in said first semi-conductive controlled rectifier.

9. A circuit as set forth in claim 8 which is further characterized to include voltage regulation means comprising:
- a Zener diode having its cathode connected to said first resistance means and its anode connected to a junction point;
- a second capacitor connected between said junction point and the negative supply lead of said D-C source;
- a diode having its anode connected to said junction point and its cathode connected to the anode of said first semi-conductive controlled rectifier, whereby voltage regulation is obtained for the charging of said first resistance-capacitance means and the current drawn from the D-C source which is not utilized in charging said first resistance-capacitance means is still utilized in the charging of said capacitor through said first semi-conductive controlled rectifier.

10. An intermittent illumination apparatus comprising:
load means which provides illumination when energized;
- a capacitor connected in series with said load means;
- a first semi-conductive controlled rectifier having its anode connected to the other side of said capacitor;
- a D-C source connected across the series combination of said load means, said capacitor and said first semi-conductive controlled rectifier;
- first timing means including a resistance joined at a first junction to a capacitance, the series timing circuit being connected across said D-C source;
- a first diode having its anode connected to said first junction point and its cathode connected to the anode of said first semi-conductive controlled rectifier;
- a Zener diode having its cathode connected to said first junction point and its anode connected to the gate electrode of said first semi-conductive controlled rectifier;
- a second semi-conductive controlled rectifier connected anode to cathode in parallel with said load means and said capacitor;
- second timing means including a resistance and capacitance joined at a second junction point, said resistance being connected to the positive D-C source and said capacitance being connected to the anode of said first semi-conductive controlled rectifier;
- a second diode having its anode connected to said second junction point and its cathode connected to the anode of said second semi-conductive controlled rectifier; and
- a second Zener diode having its cathode connected to said second junction point and its anode connected to the gate electrode of said second semi-conductive controlled rectifier.

11. An intermittent illumination apparatus as set forth in claim 10 wherein said illumination load means is a voltage doubling circuit which comprises:
- a transformer including primary and secondary windings and having the primary connected in series with said D-C source and said capacitor;
- a third diode having its anode connected to one side of the secondary of said transformer and its cathode connected to a third junction point;
- a storage capacitor connected between said third junction point and the other side of the secondary winding of said transformer;
- a gas discharge lamp having its anode connected to said third junction point and its cathode connected to the anode of said third diode, said gas discharge lamp having a breakdown voltage which is greater than the voltage developed across said storage capacitor from any unidirectional current flow through the secondary winding of said transformer.

12. An intermittent illumination apparatus as set forth in claim 10 which is further characterized to include a voltage regulation device comprising:
- a third Zener diode having its cathode connected at a predetermined resistance point in said first timing means resistance and having its anode connected to a third junction point;
- a regulation storage capacitor connected between said third junction point and a negative return lead of said D-C source; and
- a third diode having its anode connected to said third junction point and its cathode connected to the anode of said first semi-conductive controlled rectifier.

13. An intermittent illumination apparatus as set forth in claim 10 wherein said load means providing illumination is further characterized to include:
lamp means illuminated in response to energization of said load means;
a cylindrical light director element closely eneveloping said lamp means, said light director element having a series of contiguous reliefs of hemispherical cross-section along the length of the cylindrical axis.

References Cited

UNITED STATES PATENTS

| | | | |
|---|---|---|---|
| 2,175,900 | 10/1939 | Knight | 315—177 |
| 2,575,001 | 11/1951 | Bird | 315—207 |
| 3,200,258 | 8/1965 | Carroll | 307—88.5 |
| 3,288,989 | 11/1966 | Cooper | 240—11.4 |
| 3,302,128 | 1/1967 | Schoemehl et al. | 331—107 |

JOHN W. HUCKERT, *Primary Examiner.*

J. R. SHEWMAKER, *Assistant Examiner.*

U.S. Cl. X.R.

315—200, 240